(12) United States Patent
Kolessar et al.

(10) Patent No.: US 6,862,355 B2
(45) Date of Patent: Mar. 1, 2005

(54) MESSAGE RECONSTRUCTION FROM PARTIAL DETECTION

(75) Inventors: Ronald S. Kolessar, Elkridge, MD (US); Alan R. Neuhauser, Silver Spring, MD (US)

(73) Assignee: Arbitron Inc., Columbia, MD (US)

( * ) Notice: Subject to any disclaimer, the term of this patent is extended or adjusted under 35 U.S.C. 154(b) by 80 days.

(21) Appl. No.: 09/948,283

(22) Filed: Sep. 7, 2001

(65) Prior Publication Data

US 2003/0050720 A1 Mar. 13, 2003

(51) Int. Cl.[7] .............................. H04K 1/02; H04L 9/00
(52) U.S. Cl. ......................... 380/253; 713/200; 725/18
(58) Field of Search ................................ 380/200–202, 380/206, 221, 236–239, 253, 37, 42, 241, 212, 274–275; 713/176, 200, 168, 170, 181; 725/18; 700/94; 704/200, 268

(56) References Cited

U.S. PATENT DOCUMENTS

| 4,521,772 A | 6/1985 | Lyon ........................... 340/710 |
| 4,751,505 A | 6/1988 | Williams et al. ............ 340/710 |
| 5,319,735 A | 6/1994 | Preuss et al. |
| 5,379,345 A | 1/1995 | Greenberg |
| 5,450,490 A | 9/1995 | Jensen et al. |
| 5,579,124 A | 11/1996 | Aijala et al. |
| 5,581,800 A | 12/1996 | Fardeau et al. |
| 5,764,763 A | 6/1998 | Jensen et al. |
| 5,768,680 A | 6/1998 | Thomas |
| 5,828,325 A | 10/1998 | Wolosewicz et al. |
| 5,945,932 A | 8/1999 | Smith et al. |
| 6,154,484 A | 11/2000 | Lee et al. |
| 6,175,627 B1 | 1/2001 | Petrovic et al. |
| 6,360,000 B1 * | 3/2002 | Collier ....................... 382/100 |
| 6,553,127 B1 * | 4/2003 | Kurowski ................... 382/100 |

FOREIGN PATENT DOCUMENTS

| WO | WO 96/27264 | 9/1996 |
| WO | WO 98/26529 | 6/1998 |
| WO | WO 99/59275 | 11/1999 |
| WO | WO 00/04662 | 1/2000 |
| WO | WO 00/72309 | 11/2000 |

* cited by examiner

*Primary Examiner*—Hosuk Song
(74) *Attorney, Agent, or Firm*—Cowan, Liebowitz & Latman, P.C.; Eugene L. Flanagan, III

(57) ABSTRACT

A method and system for reliably detecting encoded messages included in audio media data in varying acoustic environments, where only a portion of the predetermined message may have been received or detected.

90 Claims, 9 Drawing Sheets

MESSAGE RECONSTRUCTION FROM PARTIAL DETECTION

BACKGROUND OF THE INVENTION

The present invention relates to methods and systems for accurately detecting encoded data included in audio media data.

There is considerable interest in encoding audio signals for use in audience measurement. In order to estimate what an audience is listening to at a particular time, a listener's environment is monitored for audio signals at regular intervals. If the detected audio signals contain an identification code, the message may then be quickly identified.

Based upon the receipt of identified messages, the rating or popularity of various broadcasts may be estimated. Therefore, it is very important to accurately determine which encoded audio signals have been received.

However, the acoustic characteristics of differing audio environments may vary greatly. As a result, rates for successfully receiving and identifying audio signals in the differing environments can vary significantly. Some environments for instance, may be quite hostile to the accurate detection of encoded messages because there is a large amount of noise or interference. There may also be circumstances in which the encoded message may not be detected because of a dropout in the code. In these cases, only a portion of the identification code may be received.

Therefore, a system is desired with reduced sensitivity to the acoustic environment, which can detect a code in as many differing circumstances as possible despite hostile acoustic conditions.

A system is also desired that can accurately identify the detection of an encoded message, even if only a portion of the message has been received or detected.

SUMMARY OF THE INVENTION

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested;

The term "audio media data" as used herein means any data representing or constituting audible sounds and which is widely accessible whether over-the-air, or via cable, satellite, network, internetwork (including the internet), distributed on storage media, or otherwise;

The term "message symbol" as used herein means a unit of data selected from a predefined symbol set to constitute part of a message contained in data included in audio media data;

The term "continuing stream of encoded messages" means encoded messages arranged in a predetermined time or spatial sequence, whether the sequence is continuous or interrupted;

The term "processor" as used herein means processing devices, apparatus, programs, circuits, systems and subsystems, whether implemented in hardware, software or both, and includes both individual units and groups of units;

The term "produce" as used herein with respect to data means to retain existing data for further processing as well as to derive new data based on pre-existing data, and:

The terms "first" and "second" are used to distinguish one element, set, data, object or thing from another, and are not used to designate relative position or arrangement in time.

In accordance with one aspect of the invention, a method is provided for detecting data included in audio media data as a continuing stream of encoded messages, where each message comprises a plurality of message symbols. The method comprises: detecting at least some message symbols of a first predetermined message in the continuing stream of messages; producing first message information data representing an information content of the first predetermined message based on the at least some message symbols of the first predetermined message; producing first message detection merit data representing an assigned accuracy of the first message information data as correctly representing the information content of the first predetermined message; detecting at least some message symbols of a second predetermined message in the continuing stream of messages; producing second message information data representing an information content of the second predetermined message based on the at least some message symbols of the second predetermined message; producing second message detection merit data representing an assigned accuracy of the message information data as correctly representing the information content of the second predetermined message; and confirming correct detection of the first predetermined message based on the first message detection merit data, the second message information data and the second message detection merit data.

In accordance with another aspect of the invention, a method is provided for detecting data included in audio media data as a continuing stream of encoded messages, each message comprising a plurality of message symbols. The method comprises: detecting at least some message symbols of a predetermined message in the continuing stream of messages; producing message information data representing an information content of the predetermined message based on the at least some message symbols; producing message detection merit data representing an assigned accuracy of the message information data as correctly representing the information content of the predetermined message; and confirming correct detection of the predetermined message based on the message detection merit data.

In accordance with yet another aspect of the invention, a method is disclosed for detecting data included in audio media data as a continuing stream of encoded messages. The method comprises: detecting predetermined message data representing a predetermined message of the continuing stream of encoded messages; producing message detection merit data representing a likelihood that the predetermined message data accurately represents an information content of the predetermined message; detecting further predetermined message data representing a further predetermined message of the continuing stream of encoded messages; producing further message detection merit data representing a likelihood that the further predetermined message data accurately represents an information content of the predetermined message; and confirming correct detection of the predetermined message based on the message detection merit data, the further predetermined message data and the further message detection merit data.

In accordance with yet still another aspect of the invention, a method is provided for gathering data concerning usage of audio media data, the audio media data including usage measurement data in the form of a continuing stream of encoded messages, each message comprising a plurality of message symbols. The method comprises detecting at a user location at least some message symbols of each of a plurality of predetermined messages in a continuing stream of messages in audio media data to produce detected message symbols; at the user location, producing respective message detection merit data for each of the plurality of predetermined messages, each of the respective message detection merit data representing an assigned accuracy of detection of a corresponding one of the plurality of predetermined messages; and communicating the detected message symbols and the respective message detection merit data to a media usage data producing system for producing media usage data for the audio media data.

In accordance with a further aspect of the present invention, a method is provided for detecting data included in audio media data as a continuing stream of encoded messages. The method comprises: detecting a first predetermined message of the continuing stream of encoded messages; assigning a first probability of correct detection to the first predetermined message; assigning a second probability of correct detection to the second predetermined message; and confirming correct detection of the first predetermined message based on the first probability of correct detection, the second message and the second probability of correct detection.

In accordance with still another aspect of the present invention, a system is provided for detecting data included in audio media data as a continuing stream of encoded messages, each message comprising a plurality of message symbols. The system comprises: means for detecting at least some message symbols of a first predetermined message in the continuing stream of messages; means for producing first message information data representing an information content of the first predetermined message based on the at least some message symbols of the first predetermined message; means for producing first message detection merit data representing an assigned accuracy of the first message information data as correctly representing the information content of the first predetermined message; means for detecting at least some message symbols of a second predetermined message in the continuing stream of messages; means for producing second message information data representing an information content of the second predetermined message based on the at least some message symbols of the second predetermined message; means for producing second message detection merit data representing an assigned accuracy of the message information data as correctly representing the information content of the second predetermined message; and means for confirming correct detection of the first predetermined message based on the first message detection merit data, the second message information data and the second message detection merit data.

In accordance with another aspect of the present invention, a system is provided for detecting data included in audio media data as a continuing stream of encoded messages, where each message comprising a plurality of message symbols. The system comprises: means for detecting at least some message symbols of a predetermined message in the continuing stream of messages; means for producing message information data representing an information content of the predetermined message based on the at least some message symbols; means for producing message detection merit data representing an assigned accuracy of the message information data as correctly representing the information content of the predetermined message; and means for confirming correct detection of the predetermined message based on the message detection merit data.

In accordance with yet another aspect of the present invention, a system is provided for detecting data included in audio media data as a continuing stream of encoded messages. The system comprises: means for detecting predetermined message data representing a predetermined message of the continuing stream of encoded messages; means for producing message detection merit data representing a likelihood that the predetermined message data accurately represents an information content of the predetermined message; means for detecting further predetermined message data representing a further predetermined message of the continuing stream of encoded messages; means for producing further message detection merit data representing a likelihood that the further predetermined message data accurately represents an information content of the predetermined message; and means for confirming correct detection of the predetermined message based on the message detection merit data, the further predetermined message data and the further message detection merit data.

In accordance with yet still another aspect of the present invention, a system is provided for gathering data concerning usage of audio media data, the audio media data including usage measurement data in the form of a continuing stream of encoded messages, each message comprising a plurality of message symbols. The system comprises means for detecting at a user location at least some message symbols of each of a plurality of predetermined messages in a continuing stream of messages in audio media data to produce detected message symbols; means at the user location for producing respective message detection merit data for each of the plurality of predetermined messages, each of the respective message detection merit data representing an assigned accuracy of detection of a corresponding one of the plurality of predetermined messages; and means for communicating the detected message symbols and the respective message detection merit data to a media usage data producing system for producing media usage data for the audio media data.

In accordance with a still further aspect of the present invention, a system is provided for detecting data included in audio media data as a continuing stream of encoded messages. The system comprises: means for detecting a first predetermined message and a second predetermined message of the continuing stream of encoded messages; means for assigning a first probability of correct detection to the first predetermined message; means for assigning a second probability of correct detection to the second predetermined message; and means for confirming correct detection of the first predetermined message based on the first probability of correct detection, the second predetermined message and the second probability of correct detection.

The invention and its particular features and advantages will become more apparent from the following detailed description considered with reference to the accompanying drawings.

DETAILED DESCRIPTION OF CERTAIN ADVANTAGEOUS EMBODIMENTS

Figure 1:
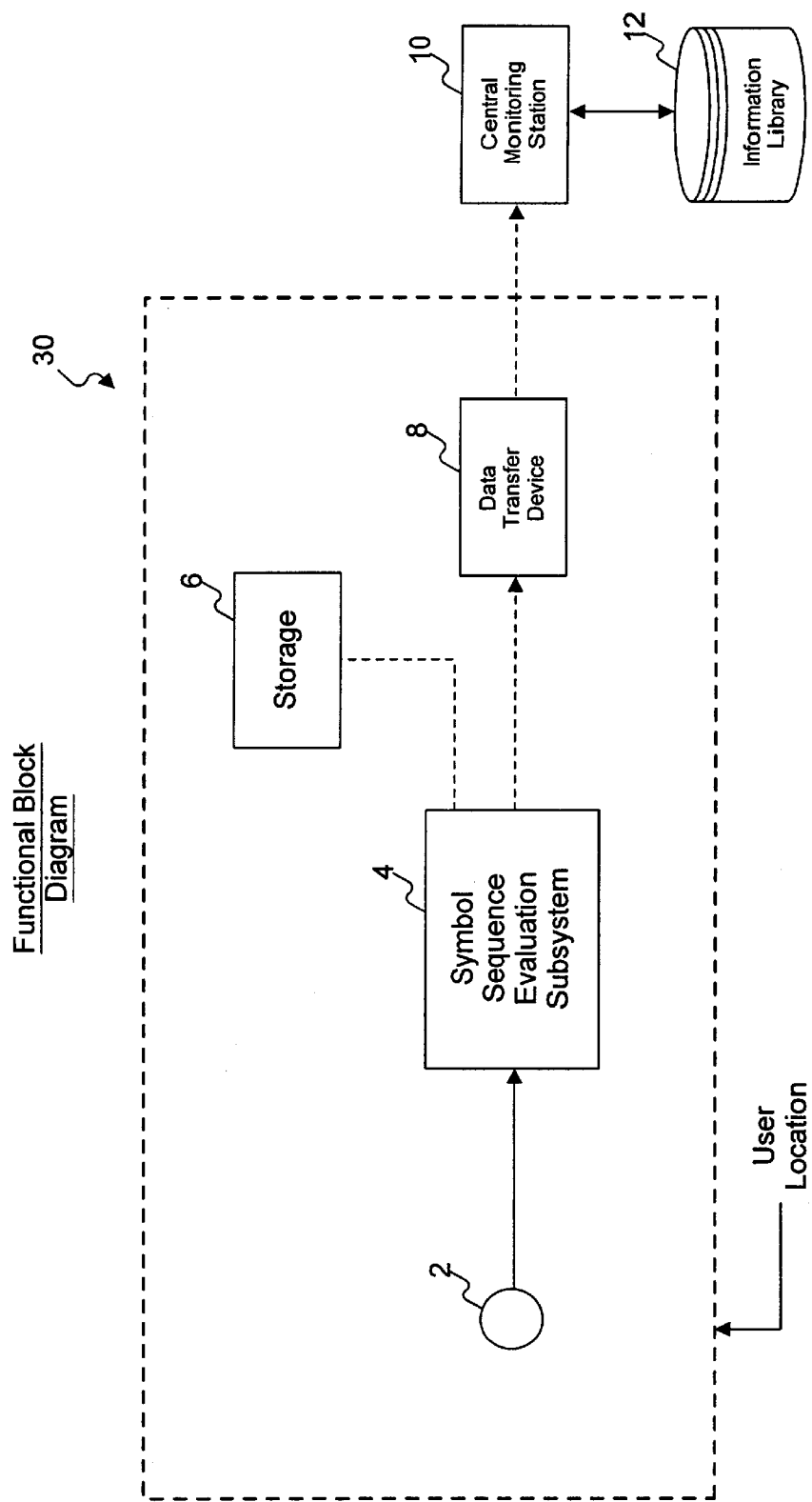
FIG. 1 is a functional block diagram illustrating a system in accordance with one embodiment of the present invention.

FIG. 1 is a functional block diagram illustrating an advantageous embodiment of a system 30 for detecting data included in audio media data as a continuing stream of encoded messages. In certain embodiments, the continuing stream of encoded messages includes data useful in audience measurement, commercial verification, royalty calculations and the like. Such data typically includes an identification of a program, commercial, file, song, network, station or channel, or otherwise describes some aspect of the media audio data or other data related thereto, so that it characterizes the audio media data. In certain embodiments, the continuing stream of encoded messages is comprised of symbols arranged time-sequentially in the audio media data.

The system 30 comprises an audio media data input 2 for detecting data included in audio media data as a continuing stream of encoded messages. The audio media data input 2 can be either a single device, stationary at a source to be monitored, or multiple devices, stationary at multiple sources to be monitored. Alternatively, the audio media data input 2 can be a portable monitoring device that can be carried by an individual to monitor multiple sources as the individual moves about.

Where the audio media data is acoustic data, the audio media data input 2 typically would be a microphone having an input which receives audio media data in the form of acoustic energy and which serves to transduce the acoustic energy to electrical data. Where audio media data in the form of light energy, is monitored, the audio media data input 2 takes the form of a light-sensitive device, such as a photodiode. The audio media data input 2 can also take the form of a magnetic pickup for sensing magnetic fields associated with a speaker, a capacitive pickup for sensing electric fields or an antenna for electromagnetic energy. In still other embodiments, the audio media data input 2 takes the form of an electrical connection to a monitored device, which may be a television, a radio, a cable converter, a satellite television system, a game playing system, a VCR, a DVD player, a portable player, a computer, a web appliance, or the like. In still further embodiments, the audio media data input 2 is embodied in monitoring software running on a computer or other reproduction system to gather media data.

A symbol sequence evaluation subsystem 4 receives input data from audio media data input 2. The symbol sequence evaluation subsystem 4 processes the input data to detect the presence of symbols which may represent encoded messages included in audio media data as a continuing stream of encoded messages. For example, the symbols may be detected in accordance with any of the techniques disclosed in U.S. Pat. No. 5,764,763 to Jensen et al., U.S. Pat. No. 5,450,490 to Jensen et al., U.S. Pat. No. 5,579,124 to Aijala et al., U.S. Pat. No. 5,581,800 to Fardeau et al., U.S. Pat. No. 5,319,735 to Preuss et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., PCT applications WO 00/04662 to Srinivasan, WO 98/26529 to Lu et al., WO 96/27264 to Lu et al., WO 99/59275 to Lu et al., and U.S. patent application Ser. No. 09/318,045 to Neuhauser, et al., all of which hereby are incorporated by reference herein.

A storage device 6 is optionally provided to store data. It may be desired to store the data produced by the symbol sequence evaluation subsystem 4 for later use. In addition, an optional data transfer device 8 is provided, if desired, to transmit data from the symbol sequence evaluation subsystem 4 to a remote location, such as a central monitoring station 10, which has an accompanying information library 12. The data produced by the symbol sequence evaluation subsystem 4 may be transferred to the central monitoring station 10 as a continuous or a continuing stream of data. Alternatively, the data produced by the symbol sequence evaluation subsystem 4 may be stored in storage device 6 for time shifted communications with the central monitoring station 10. The information library 12 accessible by the central monitoring station 10 may be utilized for instance, to produce identification data for the audio media data based on the information content of the received messages.

Figure 2:
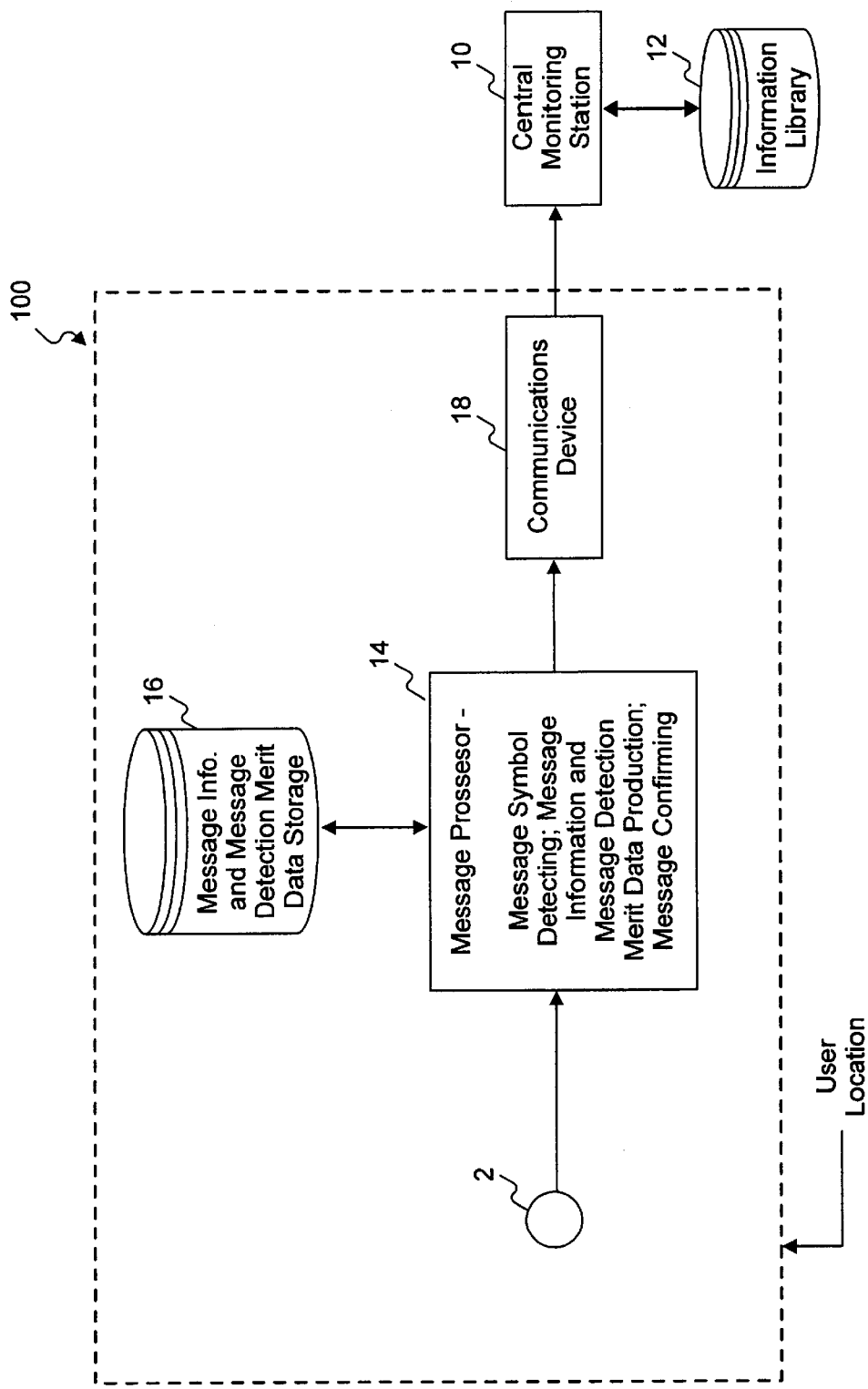
FIG. 2 is a block diagram illustrating an embodiment of the system of FIG. 1.

FIG. 2 is a block diagram illustrating an advantageous implementation 100 of the system 30. The system 100 comprises an audio media data input 2 for data, which may include audio media data having a continuing stream of encoded messages therein. The audio media data input 2 may take any of the forms described in connection with FIG. 1 above.

System 100 includes a message processor 14 which serves to process the received data in the same manner as subsystem 4 of FIG. 1 described more fully in connection with FIG. 3 below, to detect continuing streams of messages included in the received data.

Storage device 16 has been provided to store detected symbols which comprise the messages, as well as message information data representing the information content of the messages, and message detection merit data representing an assigned accuracy of the message information data or a likelihood that it is correct, all produced by the message processor 14. The message information data and the message detection merit data may later be used to confirm the detection of a predetermined message. Communications device 18 has been provided in order to communicate data from the message processor 14 to the central monitoring station 10 with its accompanying information library 12. The data communicated by communications device 18 includes confirmed or unconfirmed message information data with or without message detection merit data communicated at the time of detection from message processor 14 as a continuous or continuing stream of data. Alternatively, the data communicated by communications device 18 includes confirmed or unconfirmed message information data with or without message detection merit data communicated from storage device 16.

Figure 3:
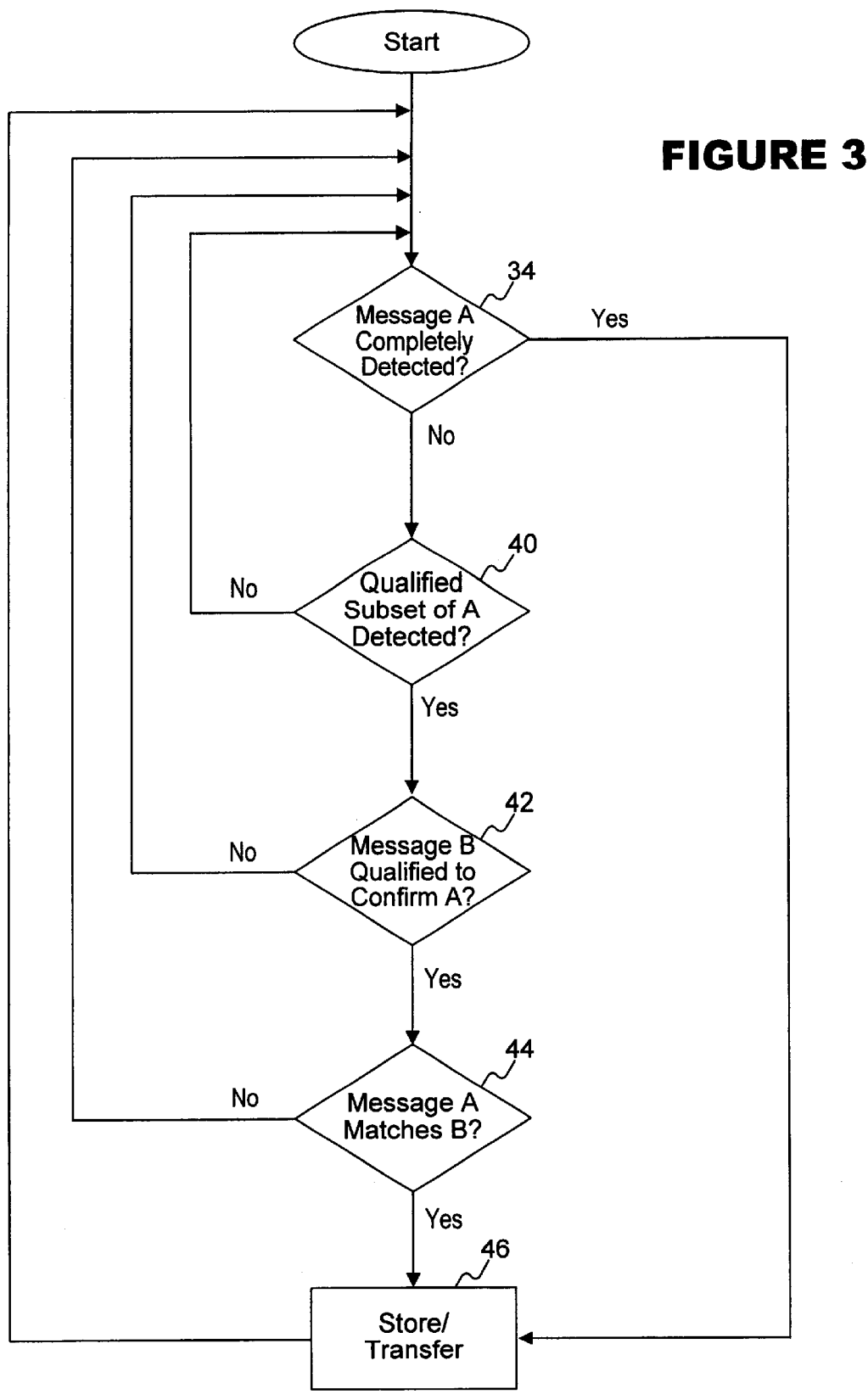
FIG. 3 is a flow diagram illustrating one mode of operation of the systems of FIGS. 1 and 2.

FIG. 3 illustrates one mode of operation of the systems 30 and 100 to detect a message A of a continuing stream of encoded messages included in audio media data wherein each message comprises a plurality of message symbols. From the stream of messages, a symbol sequence is examined at 34 to detect the presence of a message in a predetermined format, labeled "message A" for convenience herein. The symbol sequence may be selected for examination in any of a number of different ways. In one embodiment, each group of S sequential symbols or data which potentially could correspond thereto based on the length or duration of the data, is examined in the step 34. In an alternative embodiment, a group of S sequential symbols or data which could correspond thereto is selected based on a prior detection of one or more other messages in the sequence. In a further embodiment the detection of a symbol characterizing a known position in a message symbol sequence, such as a synchronization symbol, is used to select the data to be examined in step 34.

Since the message A has a predetermined format, in carrying out the step 34 the systems 30 and 100 are able to rely not only on detection of the individual symbols but also on the message format in determining whether a message has been fully detected. If, for example, message A is composed of S sequential symbols $X_1, X_2, \ldots X_s$, of which $X_i$ is a synchronization symbol, the step 34 may be carried out on the condition that the synchronization symbol $S_i$ has been detected. Then the positions of the remaining symbols are known and their presence or absence determined.

If all of the symbols of the message A have been detected, the sequence of symbols in message A are assigned a highest message detection merit data value $M_{MAX}$, representing a maximum likelihood that message A has been detected, and are stored and/or transferred 46 as message information data representing an information content of the message A, with or without the data $M_{MAX}$, for further processing.

If not all of the symbols of message A are detected, but those that were detected constitute a qualified subset of the message A, determined at 40, then the system produces message information data representing an apparent information content of message A, whether partial or complete, and the qualified subset message A is subjected to a confirmation process in steps 42 and 44.

The determination 40 that the detected symbols constitute a qualified subset of the message A, is made based on predefined qualification rules. Satisfaction of a given rule in step 40 by message A causes the system 30 or 100 to assign message detection merit data M to message A indicating that the likelihood of its correct detection is less than 100%, but sufficiently high that message A may be deemed detected subject to confirmation.

In one embodiment, the detection of at least a predetermined minimum number of the symbols of message A constitutes a qualification rule. In another embodiment, the detection of an uninterrupted sequence of symbols having at least a predetermined minimum length serves as a qualification rule. In a further embodiment, the detection of one or more predetermined synchronization symbols of message A, together with a predetermined number of message information symbols serves as a qualification rule.

Figure 4:
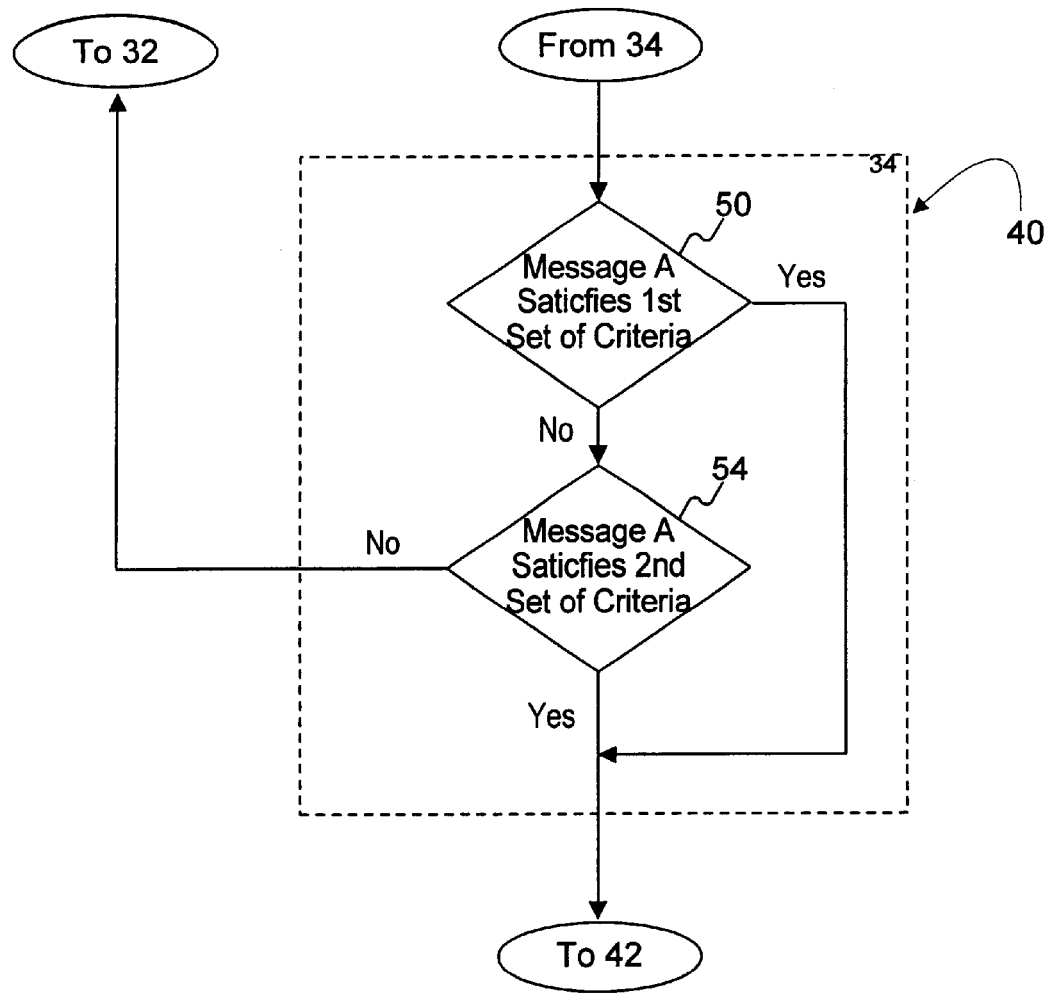
FIG. 4 is a flow diagram illustrating an implementation of one process of FIG. 3.

In still other embodiments, combinations of two or more of the foregoing qualification rules are employed, and satisfaction of any of several qualification rules or sets of rules, qualifies the detected symbol subset for confirmation in steps 42 and 44. A process for carrying out the step 40 by applying two qualification rules or criteria is illustrated in FIG. 4, wherein satisfaction of either of the two rules or criteria qualifies the detected symbol subset. In a step 50, a first set of rules or criteria are applied to the symbol subset. If the symbol subset satisfies these rules or criteria, the message A is assigned message detection merit data $M_i$ and processing continues to step 42. If not, processing instead continues in a step 54 in which a second set of rules or criteria are applied to the symbol subset. If the symbol subset satisfies the second set of rules or criteria, even if the first set is not satisfied, the message A is assigned message detection merit data $M_j$, different from $M_i$, and the symbol subset is nevertheless deemed qualified for confirmation and processing continues to step 42.

In step 42, the system 30 or 100 determines whether one or more detected messages B of the stream of messages qualify to confirm the detection of message A represented by the qualified subset of symbols.

Figure 5:
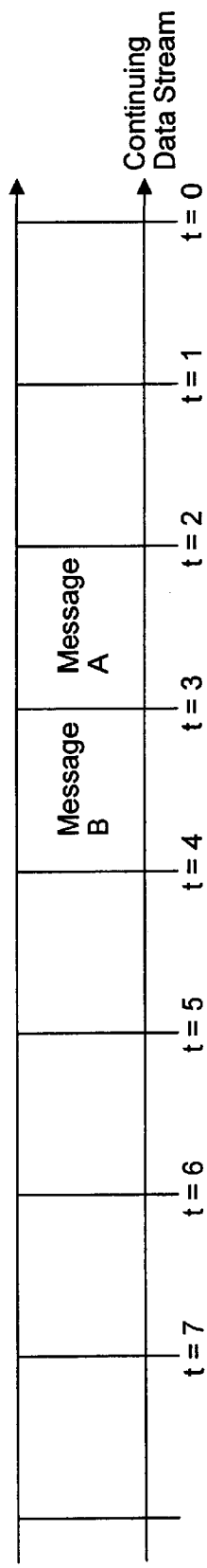
FIGS. 5 through 8 are graphs illustrating continuing streams of encoded messages.
Figure 6:
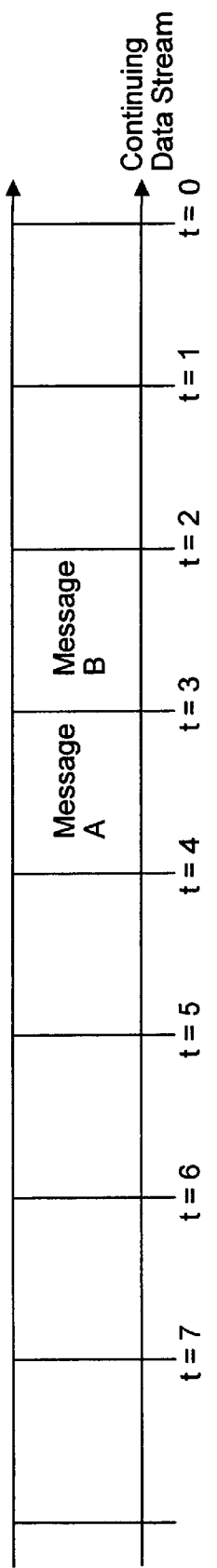

In certain embodiments, the message B is selected as the message immediately following the message A in the continuing stream of messages, as illustrated in FIG. 5. In certain other embodiments, the message B is selected as the message immediately preceding the message A as illustrated in FIG. 6. In still other embodiments, both the message immediately preceding the message A and the message immediately following message A are used to confirm a qualified subset of the message A.

Figure 7:
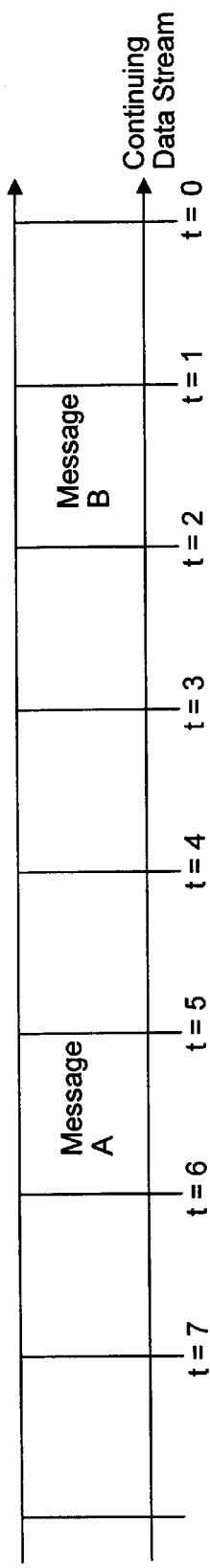
Figure 8:
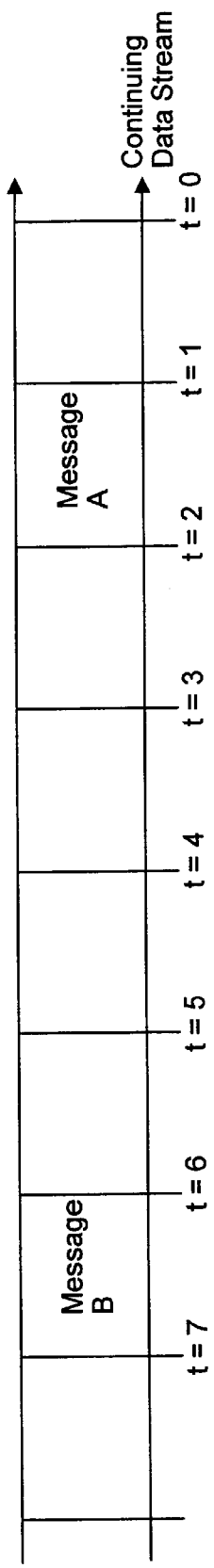

In further embodiments, the message B precedes the message A to be confirmed by two or more message intervals, as illustrated in FIG. 7. In still further embodiments, the message B follows the message A by two or more message intervals, as illustrated in FIG. 8. In yet still further embodiments, both such messages are used to confirm the qualified subset of message A. Various combinations of three or more messages are also used in still more embodiments to confirm the qualified subset of message A.

In order to qualify for confirmation in step 42 of FIG. 3, the message or messages B must satisfy one or more predetermined criteria. In certain embodiments, for a message to qualify for confirmation all of its symbols must be detected. However, in other embodiments, a detection of fewer than all of the symbols of a message may still qualify it for confirmation, so long as its message information is reliably established and/or it is only one of several confirming messages.

The system 30 or 100 produces message information data representing an apparent information content of message B, whether partial or complete, along with message detection merit data representing an assigned accuracy thereof. The message detection merit data of message B for confirmation purposes may be simply a binary symbol, but need not be.

If the message or messages B qualify to confirm the subset of A, a matching step 44 is carried out in order to confirm the apparent information content of the subset of A. In certain embodiments, the message or messages B must possess the same information content as the apparent content of the subset of A. In other embodiments in which the data is formatted so that a given information content of the message or messages B implies a different, but known information content of the message A, the correspondence of the apparent information content of the message A to such different but known information content confirms the subset of message A.

From the foregoing it will be seen that in the embodiment the confirmation of the message information data of message A depends on (1) the existence of a qualified subset of message A, as represented by its message detection merit data, (2) the qualification of message B to confirm message A, as represented by its message detection merit data, and (3) a match of the message information data of message A with that of message B.

In other embodiments, the message information data of message A is confirmed based only on its message detection merit data. For example, where a number of symbols of message A necessary to establish its information content have been detected, message A may be deemed confirmed based only on message detection merit data indicating a high probability that the message detection merit data is accurate.

Once a qualified subset of message A has been confirmed in step 44, data representing its information content with or without its message detection merit data M, $M_i$ or $M_j$ is stored and/or transferred in step 46 for further processing.

In certain advantageous embodiments, the process of FIG. 3 is modified, so that both, (i) the symbols of messages A and B are detected and, (ii) their respective message detection merit data are produced, in a monitoring system at a user location. This monitoring system is either a stationary device or a portable device carried by an audience member. The detected symbols and their respective message detection merit data are either communicated to a system which carries out steps 40, 42 and 44 of FIG. 3, or else stored for subsequent communication to such a system.

Figure 9:
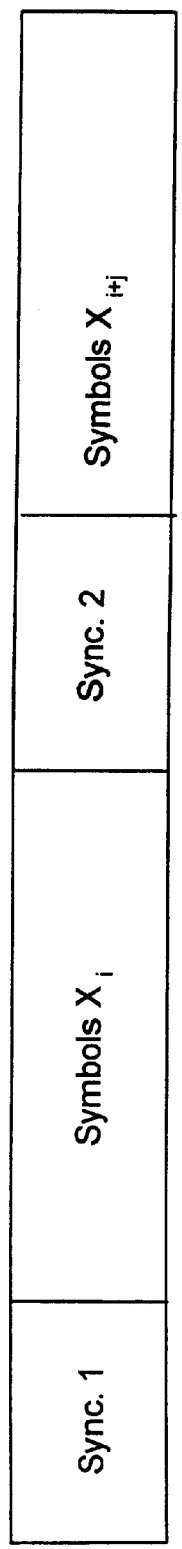
FIG. 9 is a graph illustrating an advantageous format of a message included in a continuing stream of encoded messages.

An embodiment of the invention is now described for use in detecting a continuing stream of encoded messages having a format as disclosed in U.S. patent application Ser. No. 09/318,045 hereby incorporated by reference herein. As illustrated in FIG. 9, each such message is formatted as two redundant sequences of message information symbols X having two synchronization symbols, Sync 1 and Sync 2, interspersed therewith. The symbols Sync 1 and Sync 2 are distinct from one another, so that each represents a determinable position within the message symbol sequence. The message information symbols X are selected from a predetermined symbol set of n symbols in which the symbols are arranged in a predefined sequence, conveniently designated by an index i assigned to each symbol such that i=1,2, . . . , n. For example, the predefined symbol set may have three distinct symbols, so that n=3. However, n may be selected as any positive integer greater than 1 in this exemplary message format. Preferably, but not necessarily, each symbol in the predefined symbol set includes frequency components that are uniquely different from those of all other symbols of the set, in order to facilitate the unique detection of each symbol.

The symbols X of the redundant message sequences are arranged so that if the first symbol sequence is m symbols long, and each symbol is selected from a symbol set of n unique symbols each designated by an index i, i=1, 2, . . . , n, each symbol in a corresponding position within the second symbol sequence is selected as the symbol [i+j (mod n)] of the predefined symbol set, where j is a constant integer value referred to herein as an "offset". For example, if the predefined symbol set contains seven symbols in the order $(X_1, X_2, \ldots, X_7)$, the first message sequence is $X_1X_5X_7$, and the offset j=2, then the second sequence is composed of the symbols $X_3X_7X_2$.

An advantageous embodiment of a method for detecting a message A formatted as in FIG. 9 and included in a continuing stream of messages, is now described with reference to FIGS. 3 and 4. In step 34, the symbol sequence of message A is selected based on detection of at least one of the synchronization symbols Sync 1 and Sync 2. If both of the synchronization symbols are detected along with all of the message information symbols of both sequences, and each symbol of the second sequence has the correct offset j with respect to its corresponding symbol in the first sequence, then message A is deemed detected and assigned a highest message detection merit data value $M_{MAX}$. Then the message A is stored and/or transferred in step 46 with or without $M_{MAX}$.

However, if any of the symbols of message A is not detected and/or any of the message information symbols does not have the correct offset, processing continues in step 40. With reference also to FIG. 4, in step 50 of step 40, it is determined whether at least one of the two synchronization symbols and all of the message information symbols have been detected, with all of the latter exhibiting the correct offset. If so, the detected subset of message A is assigned message detection merit data $M_i$ indicating that the likelihood of its correct detection is less than maximum but sufficiently high to warrant confirmation processing. Based on data $M_i$, the processing continues in step 42.

If the symbol subset of message A does not satisfy the first set of criteria in step 50 as described above, it is evaluated under a second set of criteria in step 54. Under the second set of criteria, the symbol subset of message A can still qualify for confirmation processing if both synchronization symbols have been detected as well as all but one of the message information symbols. That is, if all symbol detections and offsets are present, except that one of the message information symbols either is absent or fails to exhibit the correct offset, then message A is assigned message detection merit data $M_j$ indicating that the likelihood of its correct detection is less than maximum but still sufficiently high to warrant confirmation processing.

In this embodiment, message B preferably, but not exclusively, is selected as in FIG. 5 or FIG. 6. Message B qualifies in step 42 only if its assigned message detection merit data is $M_{MAX}$. That is, message B qualifies for confirmation only if all of its symbols have been detected (i.e., both synchronization symbols and all message information symbols) and all of its message information symbols have the correct offset.

If message B thus qualifies based on its message detection merit data $M_{MAX}$, then in step 44 the information content of message B is compared with the information content or apparent content of message A to detect whether they are the same. If so, the message A is deemed confirmed and its message information content is stored and/or transferred with or without its message detection merit data $M_i$ or $M_j$.

Although the invention has been described with reference to a particular arrangement of parts, features and the like, these are not intended to exhaust all possible arrangements or features, and indeed many other modification and variation will be ascertainable to those of skill in the art.

What is claimed is:

1. A method for detecting data included in audio media data as a continuing stream of encoded messages, each message comprising a plurality of message symbols, comprising:

detecting at least some message symbols of a first predetermined message in the continuing stream of messages;

producing first message information data representing an information content of the first predetermined message based on the at least some message symbols of the first predetermined message;

producing first message detection merit data representing an assigned accuracy of the first message information data as correctly representing the information content of the first predetermined message;

detecting at least some message symbols of a second predetermined message in the continuing stream of messages;

producing second message information data representing an information content of the second predetermined message based on the at least some message symbols of the second predetermined message;

producing second message detection merit data representing an assigned accuracy of the message information data as correctly representing the information content of the second predetermined message; and confirming correct detection of the first predetermined message based on the first message detection merit data, the second message information data and the second message detection merit data.

2. The method of claim 1, wherein the first predetermined message comprises a plurality of message symbols arranged in a time sequence, the plurality of message symbols including the at least some message symbols of the first predetermined message.

3. The method of claim 1 further comprising the step of detecting a first synchronization symbol and a second synchronization symbol in the first predetermined message and detecting a first synchronization symbol and a second synchronization symbol in the second predetermined message.

4. The method of claim 3, wherein the first and second synchronization symbols in the first predetermined message are separate and distinct from one another and the first and second synchronization symbols in the second predetermined message are separate and distinct from one another.

5. The method of claim 1 further comprising the step of detecting message information symbols in the first and the second predetermined messages, the message information symbols characterizing the audio media data.

6. The method of claim 1 further comprising the step of detecting a first message information symbol and a second message information symbol in the first predetermined message and detecting a first message information symbol and a second message information symbol in the second predetermined message.

7. The method of claim 6, wherein the first message information symbol of the first predetermined message and the first message information symbol of the second predetermined message each include frequency components different from frequency components of the other and represent the same information, and wherein the second message information symbol of the first predetermined message and the second message information symbol of the second predetermined message each include frequency components different from frequency components of the other and represent the same information.

8. The method of claim 1, wherein the production of the first message detection merit data is a function of the reception of synchronization symbols included in the continuing stream of encoded messages and message information symbols in the first predetermined message and the production of the second message detection merit data is a function of the reception of synchronization symbols and message information symbols in the second predetermined message.

9. The method of claim 8, wherein the first message detection merit data represents an assigned probability that the detected data contains information correctly representing the first predetermined message and the second message detection merit data represents an assigned probability that the detected data contains information correctly representing the second predetermined message.

10. The method of claim 1, wherein the information content of the first predetermined message corresponds to the information content of the second predetermined message, and comprising confirming the correct detection of the first predetermined message by detecting correspondence of the information content of the first predetermined message with the information content of the second predetermined message.

11. The method of claim 10, wherein the information content of the first predetermined message is the same as the information content of the second predetermined message.

12. The method of claim 10, wherein the information content of the first predetermined message is different from that of the information content of the second predetermined message, and the information content of the second predetermined message implies the information content of the first predetermined message.

13. A method for detecting data included in audio media data as a continuing stream of encoded messages, each message comprising a plurality of message symbols, comprising:
    detecting at least some message symbols of a predetermined message in the continuing stream of messages;
    producing message information data representing an information content of the predetermined message based on the at least some message symbols;
    producing message detection merit data representing an assigned accuracy of the message information data as correctly representing the information content of the predetermined message;
    determining an information content of a further predetermined message of the continuing stream of encoded messages; and
    confirming correct detection of the predetermined message based on the message detection merit data and the information content of the further predetermined message.

14. The method of claim 13, wherein the predetermined message comprises a plurality of message symbols arranged in a time sequence, the plurality of message symbols including the at least some message symbols of the predetermined message.

15. The method of claim 13 further comprising the step of detecting a first synchronization symbol and a second synchronization symbol in the predetermined message.

16. The method of claim 15, wherein the first and second synchronization symbols in the predetermined message are separate and distinct from one another.

17. The method of claim 13 further comprising the step of detecting message information symbols in the predetermined message, the message information symbols characterizing the audio media data.

18. The method of claim 13 further comprising the step of detecting a first message information symbol and a second message information symbol in the predetermined message.

19. The method of claim 13, wherein the production of the message detection merit data is a function of the reception of synchronization symbols and message information symbols in the predetermined message.

20. The method of claim 19, wherein the message detection merit data represents an assigned probability that the detected data contains information correctly representing the predetermined message.

21. The method of claim 13, wherein the information content of the predetermined message corresponds to the information content of the further predetermined message, and comprising confirming the correct detection of the predetermined message by detecting correspondence of the information content of the predetermined message with the information content of the further predetermined message.

22. The method of claim 21, wherein the information content of the predetermined message is the same as the information content of the further predetermined message.

23. The method of claim 21, wherein the information content of the predetermined message is different from that of the information content of the further predetermined message, and the information content of the further predetermined message implies the information content of the predetermined message.

24. A method for detecting data included in audio media data as a continuing stream of encoded messages, comprising:
    detecting a first message information symbol and a second message information symbol representing at least a portion of a predetermined message of the continuing stream of encoded messages;

producing message detection merit data representing a likelihood that the predetermined message data accurately represents an information content of the predetermined message;

detecting further predetermined message data representing a further predetermined message of the continuing stream of encoded messages;

producing further message detection merit data representing a likelihood that the further predetermined message data accurately represents an information content of the predetermined message; and confirming correct detection of the predetermined message based on the message detection merit data, the further predetermined message data and the further message detection merit data.

25. The method of claim 24, wherein the predetermined message comprises a plurality of message symbols arranged in a time sequence, the plurality of message symbols including the at least some message symbols of the predetermined message.

26. The method of claim 24, further comprising the step of detecting a first synchronization symbol and a second synchronization symbol in the predetermined message and detecting a first synchronization symbol and a second synchronization symbol in the further predetermined message.

27. The method of claim 26, wherein the first and second synchronization symbols in the predetermined message are separate and distinct from one another and the first and second synchronization symbols in the further predetermined message are separate and distinct from one another.

28. The method of claim 24 further comprising the step of detecting message information symbols in the predetermined message, the message information symbols characterizing the audio media data and detecting message information symbols in the further predetermined message, the message information symbols characterizing the audio media data.

29. The method of claim 24 further comprising detecting a first message information symbol and a second message information symbol in the further predetermined message.

30. The method of claim 29, wherein the first message information symbol of the predetermined message and the first message information symbol of the further predetermined message each include frequency components different from frequency components of the other and represent the same information, and wherein the second message information symbol of the predetermined message and the second message information symbol of the further predetermined message each include frequency components different from frequency components of the other and represent the same information.

31. The method of claim 24, wherein the production of the message detection merit data is a function of the reception of synchronization symbols and message information symbols in the predetermined message and the production of the further message detection merit data is a function of the reception of synchronization symbols and message information symbols in the further predetermined message.

32. The method of claim 31, wherein the message detection merit data represents an assigned probability that the detected first message information symbol and second information message symbol contain information correctly representing the predetermined message and the further message detection merit data represents an assigned probability that the detected further predetermined message data contains information correctly representing the further predetermined message.

33. A method for gathering data concerning usage of audio media data, the audio media data including usage measurement data in the form of a continuing stream of encoded messages, each message comprising a plurality of message symbols, comprising:

detecting at a user location at least some message symbols of each of a plurality of predetermined messages in a continuing stream of messages in audio media data to produce detected message symbols;

at the user location, producing respective message detection merit data for each of the plurality of predetermined messages, each of the respective message detection merit data representing an assigned accuracy of detection of a corresponding one of the plurality of predetermined messages; and communicating the detected message symbols and the respective message detection merit data to a media usage data producing system for producing media usage data for the audio media data.

34. The method of claim 33, comprising detecting the at least some message symbols with the use of a portable monitoring device carried by an individual.

35. The method of claim 33, comprising detecting the at least some message symbols with the use of a stationary monitoring device.

36. The method of claim 33, comprising storing the detected message symbols and the respective message detection merit data at the user location and communicating the stored detected message symbols and the stored respective message detection merit data to the media usage data producing system.

37. A method for detecting data included in audio media data as a continuing stream of encoded messages, comprising:

detecting a first predetermined message of the continuing stream of encoded messages including detecting a first information message symbol and a second information message symbol of the first predetermined message and detecting a second predetermined message of the continuing stream of encoded messages including detecting a first information message symbol and a second information message symbol of the second predetermined message;

assigning a first probability of correct detection to the first predetermined message;

assigning a second probability of correct detection to the second predetermined message; and confirming correct detection of the first predetermined message based on the first probability of correct detection, the first information message symbol and the second information message symbol of the second predetermined message and the second probability of correct detection.

38. The method of claim 37, wherein the first predetermined message comprises a plurality of message symbols arranged in a time sequence, the plurality of message symbols including the at least some message symbols of the first predetermined message.

39. The method of claim 37 further comprising the step of detecting a first synchronization symbol and a second synchronization symbol in the first predetermined message and detecting a first synchronization symbol and a second synchronization symbol in the second predetermined message.

40. The method of claim 39, wherein the first and second synchronization symbols in the first predetermined message are separate and distinct from one another and the first and second synchronization symbols in the second predetermined message are separate and distinct from one another.

41. A The method of claim 37 further comprising the step of detecting message information symbols in the first and the second predetermined messages, the message information symbols characterizing the audio media data.

42. The method of claim 37 further comprising the step of detecting a first message information symbol and a second message information symbol in the first predetermined message and detecting a first message information symbol and a second message information symbol in the second predetermined message.

43. The method of claim 42, wherein the first message information symbol of the first predetermined message and the first message information symbol of the second predetermined message each include frequency components different from frequency components of the other and represent the same information, and wherein the second message information symbol of the first predetermined message and the second message information symbol of the second predetermined message each include frequency components different from frequency components of the other and represent the same information.

44. The method of claim 37, wherein the first probability of correct detection of the first predetermined message is a function of the reception of synchronization symbols and message information symbols in the first predetermined message and the second probability of correct detection of the second predetermined message is a function of the reception of synchronization symbols and message information symbols in the second predetermined message.

45. The method of claim 44, wherein the first probability of correct detection represents an assigned probability that the detected first information message symbol and second information message symbol contain information correctly representing the first predetermined message and the second probability of correct detection represents an assigned probability that the detected second predetermined message contains information correctly representing an information content of the second predetermined message.

46. A system for detecting data included in audio media data as a continuing stream of encoded messages, each message comprising a plurality of message symbols, comprising:
 means for detecting at least some message symbols of a first predetermined message in the continuing stream of messages;
 means for producing first message information data representing an information content of the first predetermined message based on the at least some message symbols of the first predetermined message;
 means for producing first message detection merit data representing an assigned accuracy of the first message information data as correctly representing the information content of the first predetermined message;
 means for detecting at least some message symbols of a second predetermined message in the continuing stream of messages;
 means for producing second message information data representing an information content of the second predetermined message based on the at least some message symbols of the second predetermined message;
 means for producing second message detection merit data representing an assigned accuracy of the message information data as correctly representing the information content of the second predetermined message; and
 means for confirming correct detection of the first predetermined message based on the first message detection merit data, the second message information data and the second message detection merit data.

47. The system of claim 46, wherein the first predetermined message comprises a plurality of message symbols arranged in a time sequence, the plurality of message symbols including the at least some message symbols of the first predetermined message.

48. The system of claim 46, wherein the detecting means detects a first synchronization symbol and a second synchronization symbol in the first predetermined message and detecting a first synchronization symbol and a second synchronization symbol in the second predetermined message.

49. The system of claim 48, wherein the first and second synchronization symbols in the first predetermined message are separate and distinct from one another and the first and second synchronization symbols in the second predetermined message are separate and distinct from one another.

50. The system of claim 46, wherein the detecting means detects message information symbols in the first and the second predetermined messages, the message information symbols characterizing the audio media data.

51. The system of claim 46, wherein the detecting means detects a first message information symbol and a second message information symbol in the first predetermined message and detecting a first message information symbol and a second message information symbol in the second predetermined message.

52. The system of claim 51, wherein the first message information symbol of the first predetermined message and the first message information symbol of the second predetermined message each include frequency components different from frequency components of the other and represent the same information, and wherein the second message information symbol of the first predetermined message and the second message information symbol of the second predetermined message each include frequency components different from frequency components of the other and represent the same information.

53. The system of claim 46, wherein the production of the first message detection merit data is a function of the reception of synchronization symbols and message information symbols in the first predetermined message and the production of the second message detection merit data is a function of the reception of synchronization symbols and message information symbols in the second predetermined message.

54. The system of claim 53, wherein the first message detection merit data represents an assigned probability that the message information symbols of the first predetermined message contain information correctly representing the first predetermined message and the second message detection merit data represents an assigned probability that the message information symbols of the second predetermined message contain information correctly representing the second predetermined message.

55. A system for detecting data included in audio media data as a continuing stream of encoded messages, each message comprising a plurality of message symbols, comprising:
 means for detecting at least some message symbols of a predetermined message in the continuing stream of messages;
 means for producing message information data representing an information content of the predetermined message based on the at least some message symbols;

means for producing message detection merit data representing an assigned accuracy of the message information data as correctly representing the information content of the predetermined message;

determining an information content of a further predetermined message of the continuing stream of encoded messages; and means for confirming correct detection of the predetermined message based on the message detection merit data and the information content of the further predetermined message.

56. The system of claim 55, the predetermined message comprises a plurality of message symbols arranged in a time sequence, the plurality of message symbols including the at least some message symbols of the first predetermined message.

57. The system of claim 55, wherein the detecting means detects a first synchronization symbol and a second synchronization symbol in the predetermined message.

58. The system of claim 57, wherein the first and second synchronization symbols in the predetermined message are separate and distinct from one another.

59. The system of claim 55, wherein the detecting means detects message information symbols in the predetermined message, the message information symbols characterizing the audio media data.

60. The system of claim 55, where in the detecting means detects a first message information symbol and a second message information symbol in the predetermined message.

61. The system of claim 55, wherein the production of the message detection merit data is a function of the reception of synchronization symbols and message information symbols in the predetermined message.

62. The system of claim 61, wherein the message detection merit data represents an assigned probability that the detected message information symbols contain information correctly representing the predetermined message.

63. A system for detecting data included in audio media data as a continuing stream of encoded messages, comprising:

means for detecting a first message information symbol and a second message information symbol representing at least a portion of a predetermined message of the continuing stream of encoded messages;

means for producing message detection merit data representing a likelihood that the predetermined message data accurately represents an information content of the predetermined message;

means for detecting further predetermined message data representing a further predetermined message of the continuing stream of encoded messages;

means for producing further message detection merit data representing a likelihood that the further predetermined message data accurately represents an information content of the predetermined message; and means for confirming correct detection of the predetermined message based on the message detection merit data, the further predetermined message data and the further message detection merit data.

64. The system of claim 63, wherein the predetermined message comprises a plurality of message symbols arranged in time sequence, the plurality of message symbols including the at least some message symbols of the predetermined message.

65. The system of claim 63, wherein the detecting means detects a first synchronization symbol and a second synchronization symbol in the predetermined message and detecting a first synchronization symbol and a second synchronization symbol in the further predetermined message.

66. The system of claim 65, wherein the first and second synchronization symbols in the predetermined message are separate and distinct from one another and the first and second synchronization symbols in the further predetermined message are separate and distinct from one another.

67. The system of claim 63, wherein the detecting means detects message information symbols in the predetermined message, the message information symbols characterizing the audio media data and detecting message information symbols in the further predetermined message, the message information symbols characterizing the audio media data.

68. The system of claim 63, wherein the detecting means detects a first message information symbol and a second message information symbol in the predetermined message and detecting a first message information symbol and a second message information symbol in the further predetermined message.

69. The system of claim 68, wherein the first message information symbol of the predetermined message and the first message information symbol of the further predetermined message each include frequency components different from frequency components of the other and represent the same information, and wherein the second message information symbol of the predetermined message and the second message information symbol of the further predetermined message each include frequency components different from frequency components of the other and represent the same information.

70. The system of claim 63, wherein the production of the message detection merit data is a function of the reception of synchronization symbols and message information symbols in the predetermined message and the production of the further message detection merit data is a function of the reception of synchronization symbols and message information symbols in the further predetermined message.

71. The system of claim 70, wherein the message detection merit data represents an assigned probability that the detected first message information symbol and second message information symbol contain information correctly representing the predetermined message and the further message detection merit data represents an assigned probability that the detected further predetermined message data contains information correctly representing the further predetermined message.

72. A system for gathering data concerning usage of audio media data, the audio media data including usage measurement data in the form of a continuing stream of encoded messages, each message comprising a plurality of message symbols, comprising:

means for detecting at a user location at least some message symbols of each of a plurality of predetermined messages in a continuing stream of messages in audio media data to produce detected message symbols;

means at the user location for producing respective message detection merit data for each of the plurality of predetermined messages, each of the respective message detection merit data representing an assigned accuracy of detection of a corresponding one of the plurality of predetermined messages; and means for communicating the detected message symbols and the respective message detection merit data to a media usage data producing system for producing media usage data for the audio media data.

73. The system of claim 72, wherein the means for detecting comprises a portable monitoring device capable of being carried by an individual.

74. The system of claim 72, wherein the means for detecting comprises a stationary monitoring device.

75. The system of claim 72, further comprising means for storing the detected message symbols and the respective message detection merit data at the user location, and the means for communicating is operative to communicate the stored detected message symbols and the stored respective message detection merit data to the media usage data producing system.

76. A system for detecting data included in audio media data as a continuing stream of encoded messages, comprising:

means for detecting a first predetermined message and a second predetermined message of the continuing stream of encoded messages;

means for assigning a first probability of correct detection to the first predetermined message;

means for assigning a second probability of correct detection to the second predetermined message; and means for confirming correct detection of the first predetermined message based on the first probability of correct detection, the second predetermined message and the second probability of correct detection.

77. The system of claim 76, wherein the first predetermined message comprises a plurality of message symbols arranged in a time sequence, the plurality of message symbols including the at least some message symbols of the first predetermined message.

78. The system of claim 76, wherein the detecting means detects a first synchronization symbol and a second synchronization symbol in the first predetermined message and detecting a first synchronization symbol and a second synchronization symbol in the second predetermined message.

79. The system of claim 78, wherein the first and second synchronization symbols in the first predetermined message are separate and distinct from one another and the first and second synchronization symbols in the second predetermined message are separate and distinct from one another.

80. The system of claim 76, wherein the detecting means detects message information symbols in the first and the second predetermined messages, the message information symbols characterizing the audio media data.

81. The system of claim 76, wherein the detecting means detects a first message information symbol and a second message information symbol in the first predetermined message and detecting a first message information symbol and a second message information symbol in the second predetermined message.

82. The system of claim 81, wherein the first message information symbol of the first predetermined message and the first message information symbol of the second predetermined message each include frequency components different from frequency components of the other and represent the same information, and wherein the second message information symbol of the first predetermined message and the second message information symbol of the second predetermined message each include frequency components different from frequency components of the other and represent the same information.

83. The system of claim 76, wherein the first probability of correct detection is a function of the reception of synchronization symbols and message information symbols in the first predetermined message and the second probability of correct detection is a function of the reception of synchronization symbols and message information symbols in the second predetermined message.

84. The system of claim 83, wherein the first probability of correct detection represents an assigned probability that the message information symbols of the first predetermined message correctly represent the first predetermined message and the second probability of correct detection represents an assigned probability that the message information symbols of the second predetermined message correctly represent the second predetermined message.

85. A method for detecting data included in audio media data as a continuing stream of encoded messages including a first message having a first plurality of message symbols representing first predetermined message information and a second message having a second plurality of message symbols representing second predetermined message information corresponding to the first predetermined message information, comprising:

detecting at least first and second message symbols of the first message;

producing first predetermined message information data based on the detected at least first and second message symbols of the first message;

producing message detection merit data representing an assigned accuracy of the first predetermined message information data as correctly representing the information content of the predetermined message;

detecting at least first and second message symbols of the second message;

producing second predetermined message information data based on the detected at least first and second message symbols of the second message; and confirming correct detection of the first predetermined message information based on the message detection merit data and the second predetermined message data.

86. The method of claim 85, wherein the first predetermined message information is the same as the second predetermined message information.

87. The method of claim 85, wherein the first predetermined message information is different from the second predetermined message information and the second predetermined message information implies the first predetermined message information.

88. A system for detecting data included in audio media data as a continuing stream of encoded messages including a first message having a first plurality of message symbols representing first predetermined message information and a second message having a second plurality of message symbols representing second predetermined message information corresponding to the first predetermined message information, comprising:

means for detecting at least first and second message symbols of the first message;

means for producing first predetermined message information data based on the detected at least first and second message symbols of the first message;

means for producing message detection merit data representing an assigned accuracy of the first predetermined message information data as correctly representing the information content of the predetermined message;

means for detecting at least first and second message symbols of the second message;

means for producing second predetermined message information data based on the detected at least first and second message symbols of the second message; and means for confirming correct detection of the first predetermined message information based on the message detection merit data and the second predetermined message data.

89. The system of claim 88, wherein the first predetermined message information is the same as the second predetermined message information.

90. The system of claim 88, wherein the first predetermined message information is different from the second predetermined message information and the second predetermined message information implies the first predetermined message information.

* * * * *